United States Patent Office 3,466,147
Patented Sept. 9, 1969

3,466,147
PRODUCTION OF A HIGH BORIC OXIDE-CONTAINING PRODUCT
Nelson P. Nies, Laguna Beach, and Robert W. Sprague, Santa Ana, Calif., assignors to United States Borax & Chemical Corporation, Los Angeles, Calif., a corporation of Nevada
No Drawing. Filed Aug. 15, 1966, Ser. No. 572,184
Int. Cl. C01b *35/00;* C01d *3/02*
U.S. Cl. 23—149                                                  12 Claims

ABSTRACT OF THE DISCLOSURE

Vitreous boric oxide-containing product of at least 75% $B_2O_3$ is produced by heating an admixture of alkali metal or alkaline earth metal borate and hydrochloric or hydrobromic acid at a temperature of at least about 850° C. to form two molten layers. The molten layers are separated and the boric oxide product is obtained as a solid product after cooling. The other layer is also cooled to give the corresponding alkali or alkaline earth metal halide.

---

This invention relates to the production of a high boric oxide-containing product, and more particularly, this invention relates to a method for producing a high $B_2O_3$ product directly from metal borates and hydrochloric acid, hydrobromic acid, or their anhydrides.

Boric oxide finds many uses in industry, especially in applications in which a high $B_2O_3$ content material, containing small amounts of oxides of the alkali or alkaline earth metals, is desired. Thus, the oxide is used in the production of many special glass compositions, enamels, alloys, in the preparation of fluxes, and as a catalyst in organic reactions. However, the price of boric oxide has remained relatively high because of the price of the raw materials as well as the complex processing conditions required for its production.

The present invention provides a facile method for producing a vitreous boric oxide-containing product directly from low-cost raw materials. The resultant boric oxide product has a high $B_2O_3$ content of at least about 75% and is therefore especially useful for applications requiring a high $B_2O_3$ content material associated with a low amount of alkali or alkaline earth metal oxide. The present method also provides valuable alkali metal or alkaline earth metal salts as by-products.

The method provided by this invention comprises intimately mixing hydrochloric or hydrobromic acid and a metal borate selected from the group consisting of the alkali and alkaline earth metal borates to form a feed mixture, heating said feed mixture at a temperature of at least about 850° C. to form a two layer molten reaction product mixture, separating said layers while molten and cooling said separated layers to obtain vitreous boric oxide-containing material as a solid, fused product. The corresponding alkaline chloride or bromide is obtained as a valuable by-product.

The feed for the present process is prepared by intimately mixing hydrochloric acid or hydrobromic acid with one or more of the metal borates, preferably in an acid:borate mole ratio of about 2:1, the acid being calculated at HCl or HBr. A slight molar excess of either reactant can be used if desired, but a 2:1 mole ratio is presently preferred for best yields of the desired boric oxide product when sodium tetraborate is used, but up to 4:1 in the case of the calcium borate, colemanite ($Ca_2B_6O_{11} \cdot 5H_2O$).

The acids employed as reactants should have at least about 30% HCl or HBr and, preferably, are the concentrated acids of about 36% HCl or 48% HBr. The anhydrous acids, that is, gaseous HCl or HBr, can also be used if desired.

The metal borates useful in the present process are the alkali metal borate, the alkaline earth metal borates, or mixtures thereof. Examples of such borates include sodium tetraborate ($Na_2B_4O_7$) and potassium tetraborate, and the hydrates thereof, as well as the borate ores such as colemanite ($Ca_2B_6O_{11} \cdot 5H_2O$), ulexite ($NaCaB_5O_9 \cdot 8H_2O$), and mixtures of refined and unrefined borates. Due to economics and ready availability, the preferred borate reactants are sodium tetraborate and its hydrates, such as sodium tetraborate pentahydrate and sodium tetraborate decahydrate (borax). The presently preferred borate is sodium tetraborate pentahydrate.

In a preferred embodiment of this invention, concentrated hydrochloric or hydrobromic acid and a hydrated sodium tetraborate, such as the pentahydrate, in a mole ratio of 2:1, are combined in a mixing vessel at about ambient temperature. The reactants are intimately mixed to provide a slurry or paste which is then dried to a granular-type feed. If gaseous HCl or HBr are used, the acid can be passed through the solid granular borate to give a granular feed mixture.

The feed mixture can be fed to a furnace, such as a gas-fired furnace, wherein the mixture is heated at an elevated temperature of at least about 850° C. and, preferably in the range of from about 900° to about 1100° C. The reaction mixture forms two molten layers with molten boric oxide comprising the lower layer and molten sodium chloride comprising the upper layer, or in the case of sodium bromide, the layers are reversed and sodium bromide is the lower layer. The molten layers are separated preferably soon after formation, that is less than about 1–2 hours after being fed to the furnace. Although longer retention times can be used, it is generally preferred to separate the two layers soon after formation since it appears that the amount of alkaline impurities in the boric oxide increases with longer periods of contact between the two layers.

Separation of the two molten layers can be obtained by the use of dams or weirs on the furnace floor; however the present process is not restricted to this means of separating the layers since other techniques would be applicable and are well known to those skilled in the art.

Preferably, after separation of the two molten layers, the boric oxide layer is retained in the furnace for a longer period of time, such as up to about 1–2 hours, or longer if desirable, and heating of the layer continued at about the reaction temperature or higher.

After separation, each layer is discharged separately from the furnace and cooled to provide the solid $B_2O_3$-containing product and by-product salt. A particularly useful means for cooling and solidifying the molten product is to feed the molten material directly to chilled rolls. The product solidifies on the roll, falls off or is scraped off, is then cooled, and crushed to the desired size to provide a fused, glassy boric oxide-containing product. The by-product salt can be cooled and solidified in a similar manner.

The vitreous boric oxide-containing product obtained by the present method has a high $B_2O_3$ content, usually in excess of 75% and, when sodium tetraborate is employed as a reactant, generally at least about 80% $B_2O_3$.

The method of this invention is readily adapted to a continuous process in which the feed mixture is continuously fed to a furnace and the molten products are continuously withdrawn from the furnace and cooled to provide the solid products.

The invention is illustrated by the following examples but is not to be considered restricted to the specific examples given.

Example I

Sodium tetraborate pentahydrate (2870 grams) and concentrated hydrochloric acid (1635 ml.) were intimately mixed and a portion of this mixture in a clay crucible was heated in a gas-heated pot furnace at a temperature of 950° C. The lower layer was separated and cooled to give a glassy product which contained 80.5% $B_2O_3$ and 12.6% $Na_2O$.

Example II

Constant boiling hydrochloric acid (36% HCl; 215 grams) was placed in a glass container and 300 grams of sodium tetraborate pentahydrate was slowly added with stirring. The excess water was then removed by heating in a vacuum oven at 85° C. for about 15 hours. A portion of this dried feed was then fused in a platinum crucible at 1000° C. for 20 minutes. The layers were separated to give a glassy product as the lower layer which contained 80.6% $B_2O_3$ and 12.1% $Na_2O$.

Example III

Sodium tetraborate pentahydrate (300 grams) was placed in a glass container together with 200 ml. of water. While stirring the slurry, a mixture of gaseous HCl and nitrogen was bubbled through it. When the slurry tested acid to pH paper, the addition was stopped and the water then evaporated off in a vacuum oven at 85° C. A portion of the dried feed was heated in a platinum crucible at 1000° C. for 20 minutes, cooled, and the layers separated. Analysis of the lower, $B_2O_3$-rich layer gave 79.4% $B_2O_3$ and 12.8% $Na_2O$.

Example IV

Sodium tetraborate decahydrate (100 grams) was placed in a slowly rotating beaker. A mixture of gaseous HCl and nitrogen was passed through the solid until a test portion, when dissolved in water, was acid to pH paper. The rotating beaker was then heated until the solid reached 95° C. The mixture was allowed to cool and then heated in a platinum crucible at 1000° C. for 20 minutes. Analysis of the $B_2O_3$-rich layer gave 77.7% $B_2O_3$ and 13.7% $Na_2O$.

Example V

Hydrobromic acid (48% HBr; 294 grams) was placed in a glass beaker and stirred while 256 grams of sodium tetraborate pentahydrate was slowly added. The excess water was evaporated in a vacuum oven at 80° C. for about 15 hours. The dried mixture was then heated in a platinum crucible at 1000° C. for 20 minutes, cooled and the layers separated. The upper $B_2O_3$-rich layer was analyzed and gave 77.0% $B_2O_3$ and 12.1% $Na_2O$.

Various changes and modifications of the invention can be made and, to the extent that such variations incorporate the spirit of this invention, they are intended to be included within the scope of the appended claims.

What is claimed is:

1. The method for producing vitreous boric oxide-containing material of at least 75% $B_2O_3$ which comprises forming an admixture of an acid selected from the group consisting of hydrochloric acid of at least 30% HCl, hydrobromic acid of at least 30% HBr, and the anhydrides thereof and metal borate, drying said admixture to a granular feed, heating said granular feed to an elevated temperature of at least about 850° C. to form a two layer molten reaction product mixture, separating said layers while molten and cooling said separated layers to obtain vitreous boric oxide material of at least 75% $B_2O_3$ as a solid product, said metal borate being selected from the group consisting of the alkali metal and alkaline earth metal borates.

2. The method according to claim 1 in which said admixture of acid and metal borate are in a molar ratio of about 2:1.

3. The method according to claim 1 in which said admixture is heated to a temperature in the range of from about 900° C. to about 1100° C.

4. The method according to claim 1 in which said metal borate is hydrated sodium tetraborate.

5. The method according to claim 1 in which said acid is concentrated hydrochloric acid of about 36% HCl.

6. The method according to claim 1 in which said acid is concentrated hydrobromic acid of about 48% HBr.

7. The method for producing vitreous boric oxide-containing material which comprises forming an admixture of hydrochloric acid of at least 30% HCl and sodium tetraborate in a molar ratio of about 2:1, drying said admixture to a granular feed, heating said granular feed to an elevated temperature of at least about 850° C. to form a two layer molten reaction product mixture, said boric oxide material being in the lower layer, separating said layers while molten and cooling said separated layers to obtain vitreous boric oxide-containing material of at least 75% $B_2O_3$ and sodium chloride as solid products.

8. The method according to claim 7 in which said hydrochloric acid is concentrated hydrochloric acid of about 36% HCl.

9. The method according to claim 7 in which said admixture is heated to a temperature in the range of from about 900° C. to about 1100° C.

10. The method for producing vitreous boric oxide-containing material which comprises forming an admixture of hydrobromic acid of at least 30% HBr and sodium tetraborate in a molar ratio of about 2:1, drying said admixture to a granular feed, heating said granular feed to an elevated temperature of at least about 850° C. to form a two layer molten reaction product mixture, said boric oxide material being in the upper layer, separating said layers while molten and cooling said separated layers to obtain vitreous boric oxide-containing material of at least 75% $B_2O_3$ and sodium bromide as solid products.

11. The method according to claim 10 in which said hydrobromic acid is concentrated hydrobromic acid of about 48% HBr.

12. The method according to claim 10 in which said admixture is heated to a temperature in the range of from about 900° C. to about 1100° C.

References Cited

UNITED STATES PATENTS

| | | | |
|---|---|---|---|
| 1,888,391 | 11/1932 | Newman | 23—149 |
| 1,927,013 | 9/1933 | Cramer et al. | 23—149 |
| 3,026,178 | 3/1962 | Margrave et al. | 23—149 |

OTHER REFERENCES

Slavyanskii, pages 1 to 8 of translation of "Zhurnal Fizicheskoi Khimii," vol. 30, No. 9, 1956, pp. 2046–2050.

Slavyanskii, pages 1 to 7 of translation of "Zhurnal Fizicheskoi Khimii," vol. 30, No. 10, 1956, pp. 2248–2250.

HERBERT T. CARTER, Primary Examiner

U.S Cl. X.R.

23—89; 106—47